United States Patent
Vignoles et al.

(10) Patent No.: US 6,898,712 B2
(45) Date of Patent: May 24, 2005

(54) TEST DRIVER ORDERING

(75) Inventors: James Malcolm Vignoles, Aylesbury (GB); Paul Nicholas Gartside, Milton Keynes (GB); Barrett Tuttle, Aylesbury (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 830 days.

(21) Appl. No.: 09/785,241

(22) Filed: Feb. 20, 2001

(65) Prior Publication Data

US 2002/0116628 A1 Aug. 22, 2002

(51) Int. Cl.[7] ................................................ H04L 9/00
(52) U.S. Cl. .................. 713/188; 713/189; 713/200; 713/201
(58) Field of Search ................................. 713/188, 189, 713/194, 200, 201

(56) References Cited

U.S. PATENT DOCUMENTS 5,948,104 A * 9/1999 Gluck et al. ................. 713/200
6,067,410 A * 5/2000 Nachenberg .................. 703/28

* cited by examiner

Primary Examiner—Thomas R. Peeso
(74) Attorney, Agent, or Firm—Nixon & Vanderhye P.C.; Christopher J. Hamaty

(57) ABSTRACT

A library of anti computer virus test drivers is provided with classifications for the drivers which may be used to select the applied drivers in dependence upon which anti computer virus program is using that library. The library is typically shared between a suite of anti computer virus programs. The drivers are also classified with information that allows them to be placed in a priority order for application when scanning. In this way, the drivers that protect against the most threatening viruses may be checked for first and accordingly the highest level of protection achieved if the scanning process is early terminated.

15 Claims, 3 Drawing Sheets

DRIVER TYPE

| FILE TYPE TO BE SCANNED | EMBEDDED HTML | MACRO | GENERAL | TROJANS/ WORMS | GRUNT |
|---|---|---|---|---|---|
| EXECUTABLE FILES | | | ✓ | ✓ | ✓ |
| DOCUMENTS | ✓ | ✓ | ✓ | ✓ | ✓ |
| E MAILS ATTACHMENT | | ✓ | ✓ | ✓ | ✓ |
| E MAIL BODIES | ✓ | | | | |

FIG. 2

PRIORITY ORDERING

NEWLY RELEASED

HIGHLY INFECTIOUS

HIGHLY DAMAGING

WIDESPREAD

QUICK TO SCAN

GENERAL

RARE

SLOW TO SCAN

FIG. 3

TEST DRIVER ORDERING

BACKGROUND OF THE INVENTION

1. Field of the Invention

This invention relates to the field of data processing systems. More particularly, this invention relates to data processing systems that apply a plurality of tests to a target computer file, such as, for example, a plurality of anti computer virus test to scan a suspect computer file for computer viruses.

2. Description of the Prior Art

It is known to provide anti computer virus programs that apply a plurality of tests to a suspect computer file to identify if it contains a computer virus. As new computer viruses are released, tests to detect those computer viruses are developed and added to the list of tests that an anti computer virus applies to a suspect computer file. As the number of known of computer viruses increases, then the number of tests required also increases. Typical anti computer virus programs at the current time potentially apply tests for up to 60,000 different known computer viruses. The amount of computer processing resource required to perform these tests is large and ever-increasing.

There are various different types of computer virus. Some computer viruses infect only executable EXE and COM computer files, whereas other computer viruses may be macro viruses or embedded HTML viruses that only infect different file types. When a scanning engine receives a request to scan a particular computer file, then it is known to arrange that the scanning engine will select only those test drivers that check for computer viruses that could possibly infect that type of computer file, e.g. there is no point in checking an EXE file for an embedded Word macro virus.

Measures that can reduce the processing load associated with anti computer virus defence mechanisms and increase the efficiency and effectiveness of protection against computer viruses are strongly advantageous.

SUMMARY OF THE INVENTION

Viewed from one aspect, the invention provides a computer program product comprising a computer program operable to control a computer to apply a plurality of anti computer virus tests to a target computer file, said computer program comprising:

(i) a library of anti computer virus test drivers; and (ii) a test engine operable to apply a plurality of anti computer virus tests to said target computer file as specified by anti computer virus test drivers read from said library; wherein (i) said anti computer virus test drivers within said library have a classification relating to priority of use in testing said target computer file; and (ii) said anti computer virus test drivers are applied by said test engine in a priority order dependent upon classification whereby, if testing is terminated before completion, then the highest priority tests will have been applied.

The classification of anti computer virus test drivers within the library may advantageously be used to establish a priority ordering for the application of those test drivers. In particular, as the number of possible tests increases, it may be that processing resources will only allow some of the tests to be applied. In this circumstance, the classification of the anti computer virus test drivers, such that the ones representing the highest threats and/or that can be achieved relatively quickly are applied first, produces an improved overall protection level compared to just sequentially applying all of the tests in the library without any methodical ordering based upon priority. Furthermore, a user may early terminate a scanning operation and in such circumstances it is important that the most threatening computer virus should have been checked for first such that the risk associated with early termination of the full virus scan is reduced.

The classifications that are associated with the anti computer virus test drivers may include one or more of whether that driver relates to a newly released virus, a highly infectious virus, a highly damaging virus, a common virus, a test that is quick to perform, an average threat level virus, a rare virus, and a test that is slow to perform. This list may also be viewed as an approximate priority ordering, but it will be appreciated that the priority ordering once classifications are available may be dynamically altered in dependence upon the file type of the target computer file or the identity of the anti computer virus program making the test request.

Viewed from further aspects, the invention also provides a method of applying a plurality of tests to a target computer file and an apparatus for applying a plurality of tests to a target computer file.

BRIEF DESCRIPTION OF THE DRAWINGS

The above, and other objects, features and advantages of this invention will be apparent from the following detailed description of illustrative embodiments which is to be read in connection with the accompanying drawings, in which:

FIG. 2 is a diagram illustrating the relationship between a file type to be scanned by a particular anti computer virus program and the driver types used;

FIG. 3 illustrates a priority ordering in accordance with classifications associated with driver types.

DESCRIPTION OF THE PREFERRED EMBODIMENTS

Figure 1:
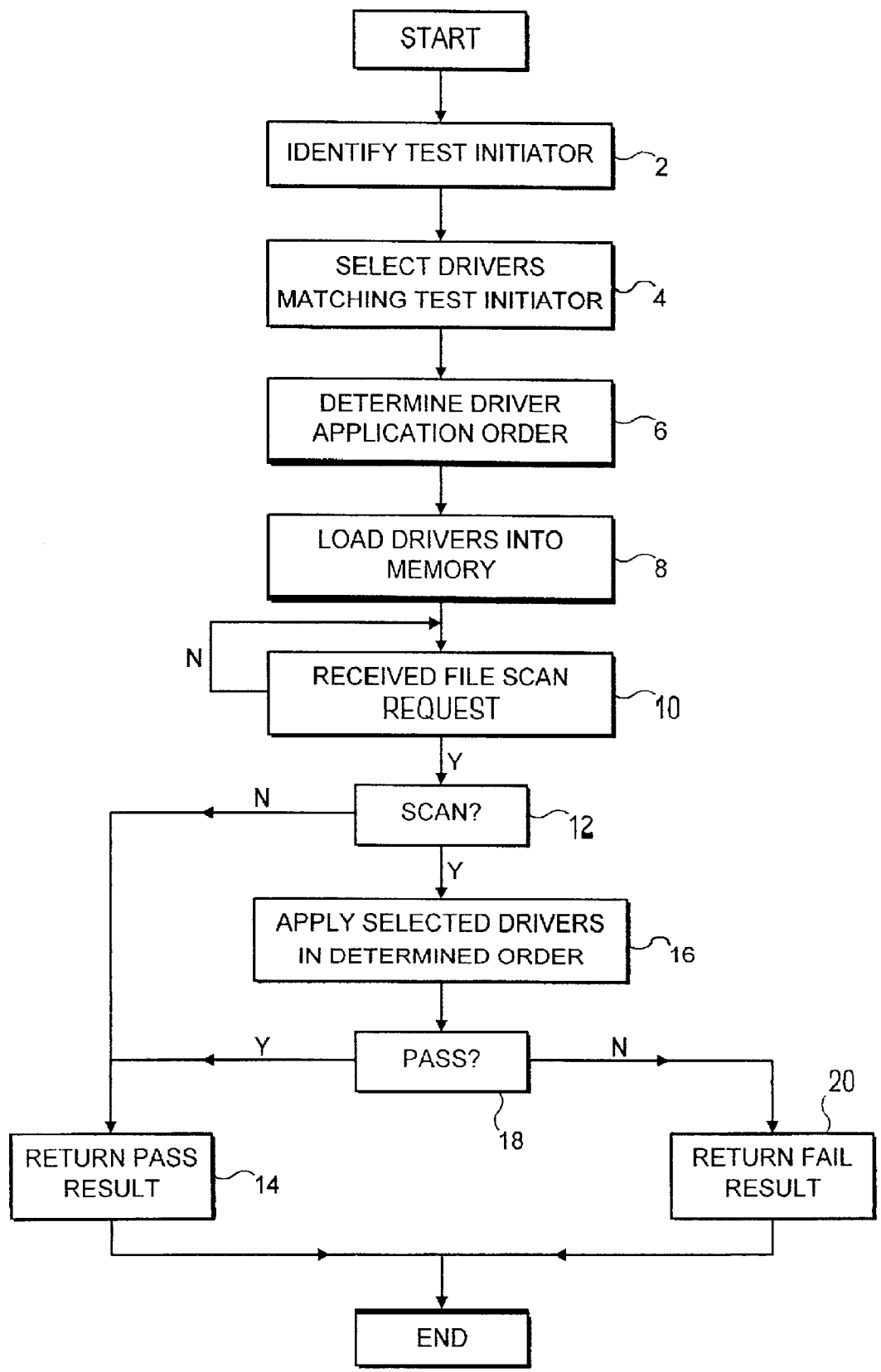
FIG. 1 is a flow diagram illustrating the operation of an anti-virus computer program.

FIG. 1 is a flow diagram illustrating the operation of an anti-virus computer program. At step 2, the identity of the test requestor/initiator is identified. In many cases, this step will be implicit as it will be built into a particular anti computer virus program which inherently will know its own identity. However, if generic code were written for this purpose, then the identifying test of step 2 would be required.

At step 4, the drivers matching the identity of the test initiator are selected from the library of anti computer virus test drivers stored within the system. The drivers have classification data associated with them indicating the computer file types to which they apply and the identity of different test initiators that will use them. The library of drivers may be viewed as a database and the selection a search and filtering operation through this database. The driver selection is made upon the basis of the identity of the test initiator rather than upon the file type of the target computer file.

At step 6, the priority order of the drivers selected at step 4 is established and the drivers are sorted into an order where the highest priority drivers will be applied first and the lowest priority drivers applied last.

At step 8, the selected and ordered drivers are loaded into random access memory from which they may be rapidly retrieved as opposed to being stored upon non-volatile storage media such as the hard disk drive of a system. At step 10, the program waits until it receives a scan request.

At step 12, when a scan request is received, a determination is made based upon the computer file type as to whether or not this particular test initiator is responsible for anti computer virus scanning for that file type. It may be that the target computer file needs processing, such as by unzipping or by searching for embedded further computer files before a determination can be made at step 12 as to whether or not to scan. The different test initiators may be different anti computer virus programs, such as an e-mail body scanner, an e-mail attachment scanner, an on-access scanning agent, an on-demand scanner, a firewall scanner or a network server scanner amongst other program types. As an example, an e-mail body scanner will typically only be responsible for scanning computer files to see if they contain any HTML embedded viruses. The responsibility for scanning e-mail attachments which may have a wide variety of file types and be subject to many more different potential virus threats is handled by other programs within the anti-virus computer system as a whole, such as an e-mail attachment scanner or a firewall scanner.

If the test at step 12 is that no scan is required, then processing proceeds to step 14 at which a pass result is returned to the scan requestor.

If a scan is required, then processing proceeds to step 16 at which the selected and ordered drivers produced from steps 4 and 6 are applied in their priority order. During the scanning that takes place at step 16, an early terminate request can be received, for example by a user cancelling the scanning process or by an automatic time-out, but the priority ordering carried out at step 6 will have ensured that at least the highest threat viruses will have been scanned for.

At step 18, a test is made as to whether or not the scanning tests have been passed. If the tests have been passed, then processing proceeds to step 14 and a pass result is returned, whereas if the tests have not been passed then processing proceeds to step 20 and a fail result is returned.

FIG. 2 illustrates the relationship between different file types that a particular test initiator may be responsible for checking and the driver types that should be employed. The driver types include embedded HTML viruses, macro viruses, general viruses, trojans and worms, and grunt drivers (e.g. slow drivers that require the entire computer file to be tested, such as to provide protection against polymorphic viruses or the like). It will be seen from FIG. 2 that if a particular anti-virus computer program is only intended to provide protection against viruses contained within e-mail bodies, then only the embedded HTML drivers need to be applied. Conversely, if the anti computer virus product in question is intended to provide protection against viruses that may be carried by documents, then all of the different driver types should be selected for application by that anti computer virus program.

FIG. 3 illustrates example classifications that may be associated with drivers to assist in establishing a priority ordering for their application. These classifications typically relate to either the nature of the virus they protect against or the nature of the test itself. More than one classification may apply. The classifications include information regarding whether the driver relates to a newly released virus, a highly infectious virus, a highly damaging virus, a widespread virus, a quick-to-scan-for virus, a general average level threat virus, a rare virus, or a slow-to-scan-for virus. FIG. 3 represents an approximate priority ordering that could be applied. Particular anti-virus computer programs may alter the priority ordering shown in FIG. 3. As an example, the most highly infectious viruses, such as embedded e-mail macro viruses that can cause significant problems due to their rapid spread, may be checked for first within an e-mail scanning program as this is the primary frontline defence against such viruses. Conversely, in a network server scanning system, a greater threat may be from newly released viruses as these are more likely to be the ones received from outside the system and made their way on to the server through what were unprepared virus defences.

Figure 4:
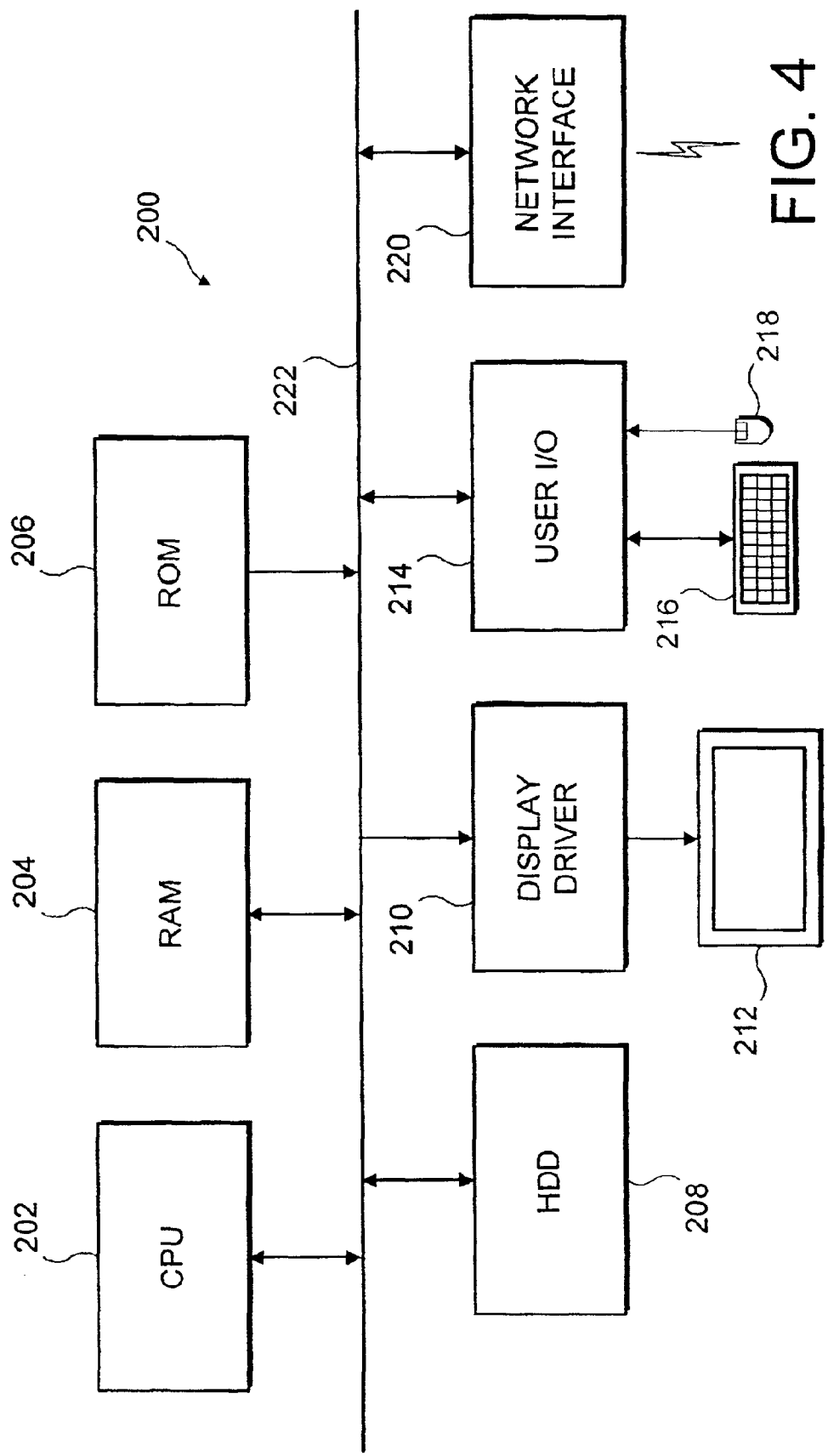
FIG. 4 illustrates a general purpose computer architecture for carrying out the techniques described above.

FIG. 4 schematically illustrates a computer 200 of a type that may be used to execute the computer programs described above. The computer 200 includes a central processing unit 202, a random access memory 204, a read-only memory 206, a hard disk drive 208, a display driver 210 and display 212, a user input/output circuit 214, a keyboard 216, a mouse 218 and a network interface circuit 220, all coupled via a common bus 222. In operation, the central processing unit 202 executes computer programs using the random access memory 204 as its working memory. The computer programs may be stored within the read-only memory 206, the hard disk drive 208 or retrieved via the network interface circuit 220 from a remote source. The computer 200 displays the results of its processing activity to the user via the display driver 210 and the display 212. The computer 200 receives control inputs from the user via the user input/output circuit 214, the keyboard 216 and the mouse 218.

The computer program product described above may take the form of a computer program stored within the computer system 200 on the hard disk drive 208, within the random access memory 204, within the read-only memory 206, or downloaded via the network interface circuit 220. The computer program product may also take the form of a recording medium such as a compact disk or floppy disk drive that may be used for distribution purposes. When operating under control of the above described computer program product, the various components of the computer 200 serve to provide the appropriate circuits and logic for carrying out the above described functions and acts. It will be appreciated that the computer 200 illustrated in FIG. 4 is merely one example of a type of computer that may execute the computer program product, method and provide the apparatus described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product comprising a computer program operable to control a computer to apply a plurality of anti computer virus tests to a target computer file, said computer program comprising:
   (i) a library of anti computer virus test drivers; and
   (ii) a test engine operable to apply a plurality of anti computer virus tests to said target computer file as specified by anti computer virus test drivers read from said library; wherein
      (a) said anti computer virus test drivers within said library have respective associated classification data relating to priority of use in testing said target computer file; and (b) said anti computer virus test drivers are applied by said test engine in a variable priority order dependent upon said respective associated classification data whereby, if testing is terminated before completion, then the highest priority tests will have been applied.

2. A computer program product as claimed in claim 1, wherein said respective associated classification data specifies an anti computer virus test driver as relating to at least one of:

(i) a newly released virus;
(ii) a highly infectious virus;
(iii) a highly damaging virus;
(iv) a common virus;
(v) a test that is quick to perform;
(vi) an average threat level virus;
(vii) a rare virus; and
(viii) a test that is slow to perform.

3. A computer program product as claimed in claim 1, wherein said variable priority order is also dependent upon a file type of said target computer file.

4. A computer program product as claimed in claim 1, wherein a plurality of different anti computer virus programs may trigger testing of said target computer file and said variable priority order is also dependent upon which anti computer virus program triggered said testing.

5. A computer program product as claimed in claim 4, wherein said plurality of anti computer virus programs include at least one of:

(i) an e-mail body scanner;
(ii) an e-mail attachment scanner;
(iii) an on-access scanning agent;
(iv) an on-demand scanner;
(v) a firewall scanner; and
(vi) a network server scanner.

6. A method of applying a plurality of anti computer virus tests to a target computer file, said method comprising:

(i) applying a plurality of anti computer virus tests to said target computer file as specified by anti computer virus test drivers read from a library of anti computer virus test drivers; wherein
(i) said anti computer virus test drivers within said library have respective associated classification data relating to priority of use in testing said target computer file; and
(ii) said anti computer virus test drivers are applied in a variable priority order dependent upon said respective associated classification data whereby, if testing is terminated before completion, then the highest priority tests will have been applied.

7. A method as claimed in claim 6, wherein said respective associated classification data specifies an anti computer virus test driver as relating to at least one of:

(i) a newly released virus;
(ii) a highly infectious virus;
(iii) a highly damaging virus;
(iv) a common virus;
(v) a test that is quick to perform;
(vi) an average threat level virus;
(vii) a rare virus; and
(viii) a test that is slow to perform.

8. A method as claimed in claim 6, wherein said variable priority order is also dependent upon a file type of said target computer file.

9. A method as claimed in claim 6, wherein a plurality of different anti computer virus programs may trigger testing of said target computer file and said variable priority order is also dependent upon which anti computer virus program triggered said testing.

10. A method as claimed in claim 9, wherein said plurality of anti computer virus programs include at least one of:

(i) an e-mail body scanner;
(ii) an e-mail attachment scanner;
(iii) an on-access scanning agent;
(iv) an on-demand scanner;
(v) a firewall scanner; and
(vi) a network server scanner.

11. Apparatus for applying a plurality of anti computer virus tests to a target computer file, said apparatus comprising:

(i) a memory operable to store a library of anti computer virus test drivers; and
(ii) processing circuits operable to serve as a test engine to apply a plurality of anti computer virus tests to said target computer file as specified by anti computer virus test drivers read from said library; wherein
(a) said anti computer virus test drivers within said library have respective associated classification data relating to priority of use in testing said target computer file; and
(b) said anti computer virus test drivers are applied by said test engine in a variable priority order dependent upon said respective associated classification data whereby, if testing is terminated before completion, then the highest priority tests will have been applied.

12. Apparatus as claimed in claim 11, wherein said respective associated classification data specifies an anti computer virus test driver as relating to at least one of:

(i) a newly released virus;
(ii) a highly infectious virus;
(iii) a highly damaging virus;
(iv) a common virus;
(v) a test that is quick to perform;
(vi) an average threat level virus;
(vii) a rare virus; and
(viii) a test that is slow to perform.

13. Apparatus as claimed in claim 11, wherein said variable priority order is also dependent upon a file type of said target computer file.

14. Apparatus as claimed in claim 11, wherein a plurality of different anti computer virus programs may trigger testing of said target computer file and said variable priority order is also dependent upon which anti computer virus program triggered said testing.

15. Apparatus as claimed in claim 14, wherein said plurality of anti computer virus programs include at least one of:

(i) an e-mail body scanner;
(ii) an e-mail attachment scanner;
(iii) an on-access scanning agent;
(iv) an on-demand scanner;
(v) a firewall scanner; and
(vi) a network server scanner.

* * * * *